United States Patent [19]

Parker et al.

[11] Patent Number: 4,896,725
[45] Date of Patent: Jan. 30, 1990

[54] IN-WELL HEAT EXCHANGE METHOD FOR IMPROVED RECOVERY OF SUBTERRANEAN FLUIDS WITH POOR FLOWABILITY

[76] Inventors: Marvin T. Parker, 11506 Spring Glenn Dr., Houston, Tex. 77070; Peter J. Noonan, 24099 Shooting Star Dr., Golden, Colo. 80401

[21] Appl. No.: 206,135

[22] Filed: Jun. 13, 1988

Related U.S. Application Data

[63] Continuation-in-part of Ser. No. 934,696, Nov. 25, 1986, abandoned.

[51] Int. Cl.$^4$ ............... E21B 43/24; E21B 43/40
[52] U.S. Cl. ............... 166/267; 166/57; 166/302; 166/372
[58] Field of Search ............... 166/302, 303, 272, 372, 166/267, 259, 263, 57; 417/55, 54; 299/3, 6, 7

[56] References Cited

U.S. PATENT DOCUMENTS

| | | | |
|---|---|---|---|
| 1,816,260 | 7/1931 | Lee . | |
| 2,034,798 | 3/1936 | Clark | 166/263 |
| 2,754,098 | 7/1956 | Heinze | 166/303 X |
| 2,911,047 | 11/1959 | Henderson | 166/61 |
| 2,929,451 | 3/1960 | Hurlstone et al. | 166/303 |
| 3,003,555 | 10/1961 | Freeman et al. | 166/288 |
| 3,072,191 | 1/1963 | Bond et al. | 166/257 |
| 3,180,413 | 4/1965 | Willman | 166/272 |
| 3,260,308 | 7/1966 | Cryer | 166/267 |
| 3,284,281 | 11/1966 | Thomas | 166/259 |
| 3,289,763 | 12/1966 | Belknap | 166/303 |
| 3,312,281 | 4/1967 | Belknap | 166/303 |
| 3,379,247 | 4/1968 | Santourian | 166/272 |
| 3,393,733 | 7/1968 | Kuo et al. | 166/267 |
| 3,548,939 | 12/1970 | Bennett | 166/267 |
| 3,620,571 | 11/1971 | Billings | 166/303 X |
| 3,948,323 | 4/1976 | Sperry et al. | 166/303 |
| 4,327,805 | 5/1982 | Poston | 166/272 |
| 4,362,213 | 12/1982 | Tabor | 166/267 |

OTHER PUBLICATIONS

Miller, "Gas-Lift Method of Flowing Oil Wells", Bulletin 323, Bureau of Mines, U.S. Dept. of Commerce, Sep. 29, 1930, pp. 35, 36, 41, 42, 98, 99 and 100.
Newberry et al., "Formation Damage Prevention Through Control of Paraffin and Asphaltene Deposition", SPE 13796 (1985), pp. 53-58 and Table 1, FIGS. 1-5.
Uren, *Petroleum Production Engineering, Oil Field Exploitation*, 3rd Edition, McGraw-Hill Book Co., N.Y., 1953, pp. 250-253.
Stang, H. R. & Soni, Y., "Saner Ranch Pilot Test of Fracture-Assisted Steamflood Technology", Journal of Petroleum Technology (Jun. 1987) pp. 684-696.
Tuttle, Robert N., "High Pour Point and Asphaltic Crude Oils and Condensates" Journal of Petroleum Technology (Jun. 1983), pp. 1192-1196.
Siffferman, Thomas R., "Flow Properties of Difficult to Handle Waxy Crude Oils", Journal of Petroleum Technology (Aug., 1979) pp. 1042-1050.
Matlaach, W. J. and Newberry, M. E., "Paraffin Deposition and Rheological Evaluation of High Wax Content Altamont Crude Crude Oils", SPE 11851 (1983), pp. 321-328.
Barker, K. M., "Formation Damage Related to Hot Oiling", SPE 16230 (1987) pp. 441-448.

*Primary Examiner*—Stephen J. Novosad
*Attorney, Agent, or Firm*—Pravel, Gambrell, Hewitt, Kimball & Krieger

[57] ABSTRACT

An in-well heat exchange method for improved recovery of subterranean fluids with poor flowability. The method includes conducting a fluid from a subterranean formation through a well in fluid communication therewith to the surface, and flowing a heated gas enriched in $C_5$ plus hydrocarbons from the surface into the well in heat exchange relationship with the fluid conducted from the formation. In one embodiment, the heated gas is injected into the subterranean fluid as a lift gas to artificially lift the subterranean fluid to the surface, wet gas is separated from the produced fluid, and a portion of the recovered gas is heated and compressed for recycle as the lift gas.

19 Claims, 3 Drawing Sheets

IN-WELL HEAT EXCHANGE METHOD FOR IMPROVED RECOVERY OF SUBTERRANEAN FLUIDS WITH POOR FLOWABILITY

This application is a continuation-in-part application of U.S. Ser. No. 934,696, filed on Nov. 25, 1986, now abandoned.

FIELD OF THE INVENTION

The present invention relates to a method of producing fluids from a subterranean formation which have poor flowability due to marked viscosity increases or fouling upon reduction of their temperature below that of the formations in which they occur, and particularly to the production of high viscosity, high pour point, high paraffin-based and/or high asphalt-based crude oils from low pressure reservoirs. The invention further relates to a method of descaling wells used in the production of fluids from subterranean formations.

BACKGROUND OF THE INVENTION

Fluids, such as crude oil, molten sulfur and geothermal brine, conducted from subterranean formations through wells contain dissolved or entrained gas, often referred to as "wet gas". Separators are conventionally employed to isolate the wet gas, water and desired crude oil. The isolated wet gas is then converted to a wide variety of transportation fuels and petrochemicals by further separating the $C_1/C_2$ dry gas fraction (natural gas) from the $C_3$–$C_4$ and $C_5+$ paraffin rich fraction. The $C_1/C_2$ dry gas fraction is ultimately used as natural gas fuel and is also converted to methanol by steam reforming. The $C_3$–$C_4$ and $C_5+$ fractions are converted to gasoline, distillate and lubricating oil by thermal cracking.

A commonly observed phenomenon in the production of such fluids as crude oil is the deposition of paraffin or asphaltene onto the walls of production tubing or the wellbore. Such precipitation occurs most readily at decreased operating temperatures and effectively reduces the cross-sectional area of the tubing thereby restricting the flow of the fluid. This problem becomes most severe as the crude flows up the well from the relatively hot reservoir to the relatively cool surface. While wells completed in many reservoirs may flow without artificial lift for several months, or even a year or more, production therefrom will eventually decline to a noneconomic rate due to such reduced reservoir pressures.

Concomitant with the reduced reservoir pressure, the crude becomes more and more viscous as the gas is removed therefrom. The problem is compounded because the lower production rate due to the decreased reservoir pressure increases the residence time of the crude in the production tubing, which in turn results in more heat lost by the crude to the surrounding formations as it travels up the well. This, in turn, increases the viscosity of the oil and further reduces the flow rate. A marked reduction in the flow rate is observed when the temperature of the oil in the wellbore falls below its cloud point and pour point.

Various methods, such as the application of hot oil, hot water and chemicals, have been employed for the removal of paraffin and/or asphaltene deposits from production tubing and wellbores. In particular, hot water has heretofore been employed in a heating string in conjunction with a power fluid system for a downhole hydraulic pump; the hot water and power fluid typically being conducted down the well in separate tubing strings and mixed with the reservoir effluent in the well annulus. However, it has been very expensive to heat the heating string, and to pump a sufficient quantity of the power fluid to the downhole pump at an effective pressure, typically 3000 psi.

While controlling depositions by the addition into the bore of chemicals such as solvents, dispersants, detergents and crystal modifiers has been further documented, such methods are likewise uneconomical since, in general, wells must be pre-treated and production ceased in most cases prior to their introduction.

An object of the present invention is to provide an efficient method and system for recovering subterranean fluids with temperature and/or chemical dependent limited flowability through the use of heated gas as a heat exchange medium in the well which maintains the fluid in a flowable state as it travels to the surface and during processing in surface facilities.

A further object of this invention is to provide a method for descaling a well with chemicals and heated gas.

SUMMARY OF THE INVENTION

The present invention provides in its broadest aspect a method for producing fluid from a subterranean formation through a well in fluid communication therewith. The method includes the steps of conducting the fluid from the subterranean formation up through the well to the surface, and conducting a gas from the surface into heat exchange relationship with the upward flowing fluid in the well with the gas being at a higher temperature than the upward flowing fluid. The heat exchange is preferably countercurrent, and the method may also include mixing the gas with the fluid at a point in the well beneath the surface, recovering gas from the fluid produced at the surface, heating at least a portion of the recovered gas, and recycling the heated gas as at least a part of the heat exchange gas.

As used hereinafter, the term "subterranean fluid" refers to any naturally occurring subterranean fluid or fluid obtained from subterranean modification processes, including, for example, crude oil, gas, condensate, molten sulfur and other molten minerals, water, brine, leached mineral solutions, and the like.

In another aspect, the invention provides a method for producing fluid from a subterranean formation through a well in fluid communication therewith. The method includes the steps of (a) conducting the fluid from the subterranean formation up through the well toward the surface; (b) introducing a gas into the fluid in the well at a point below the surface to enhance the fluidity thereof; and (c) conducting the gas down the well to the point of introduction into the fluid in countercurrent heat exchange with the enhanced fluid, with the gas being at a higher temperature than the enhanced fluid for a substantial extent of the well.

In still another aspect, the invention provides a method for producing fluid from a subterranean formation through a well in fluid communication therewith, which method includes the steps of (a) withdrawing fluid from the subterranean formation into the well, (b) enhancing the fluidity thereof in the well with lift gas, (c) producing the enhanced fluid at the surface, (d) separating and recovering wet gas from the produced fluid, (e) heating at least a portion of the recovered gas to a temperature above that of the enhanced fluid produced at the surface, (f) pumping the heated wet gas down into the well in heat exchange relationship with the enhanced fluid, and (g) using the gas pumped down the well in step (f) as lift gas in step (b). The lift gas may be admixed with the fluid at one or more gas lift valves positioned in the well near or above the subterranean formation at an effective depth beneath the surface to lift the fluid thereto.

Further, the present invention provides a method for producing fluid from a subterranean formation through a well in fluid communication therewith, which method includes the steps of (a) conducting fluid from the producing formation into the well; (b) heating and compressing a lift gas; (c) admixing the heated lift gas with the fluid at one or more gas lift valves positioned in the well near or above the producing formation at an effective depth beneath the surface to lift the fluid thereto; (d) placing the admixture in heat exchange relationship with the heated lift gas in the well prior to said admixture of the lift gas at the lift valve or valves, the lift gas being at a higher temperature than the admixture; (e) producing the admixture at the surface; and (f) recovering wet gas from the admixture produced at the surface, and recycling at least a portion of the recovered gas to the heating and compressing step. The admixture is preferably produced through a tubing string and the hot lift gas fed to the lift valve or valves through the annulus around the tubing in countercurrent heat exchange with the admixture. The method may be used with difficult-to-lift crudes such as oil having gravity of less than about 20° API, a paraffin content of more than about 5% by weight of the oil, and/or an asphalt content of more than about 5% by weight of the oil.

Still further, the invention provides a method for producing fluid from a subterranean formation through a well in fluid communication therewith, which method includes the steps of (a) conducting fluid from the producing formation into the well, the fluid having a high pour point and/or high paraffin or asphalt content, (b) introducing lift gas comprising a gas enriched in $C_5+$ hydrocarbons, into the well, the gas flowing down the well in heat exchange relationship with the fluid at a temperature effective to maintain the flowability of the fluid and to eliminate paraffin and asphalt buildup in the well at all depths thereof, and (c) injecting the gas into the fluid in the well at a depth, rate and pressure effective to fluidize and lift the fluid to the surface.

In yet another aspect, the invention provides a method for chemically descaling build-up materials, such as calcium carbonate, and removal of deposited paraffin and asphaltene from various surfaces of the well, which method includes the steps of conducting a gas and a chemical descaling agent into the well, the gas being at a higher temperature than the melting point of the deposited paraffin, asphaltene and other build-up.

In still another aspect, the invention provides an artificial lift system for producing fluid from a low pressure subterranean formation. The system includes a well in fluid communication with the formation, means for conducting fluid from the formation into the well, means for injecting lift gas into the fluid in the well at a depth, rate, temperature and pressure effective to lift the fluid to the surface, means for heating the lift gas to a temperature in excess of that of the fluid produced at the surface, and means for placing the heated lift gas in heat exchange relationship in the well with the fluid during the lifting of the fluid. The system may be used in conjunction with the production of crude oil which has a high cloud or pour point, high viscosity and/or a high paraffin or asphalt content. The injection means may be one or more lift valves spaced vertically along the well beneath the surface near or above the producing formation. The system preferably includes a centrally disposed production tubing string for conducting the fluid to the surface, and an annulus around the tubing for conducting the lift gas to the lift valve lift valves, or around the bottom of the tubing. The system may also include a separator means for recovering wet gas from the fluid produced at the surface, and means for recycling at least a portion of the recovered wet gas to the heating means. Further, the system may also include a means for introducing into the well an outside gas enriched in $C_5+$ hydrocarbons and may additionally comprise a means for introducing an outside gas into the well for mixing with either said wet gas or gas enriched in $C_5+$ hydrocarbons. Further, the system may also include a means for introducing into the well a chemical for descaling build-up materials from the various surfaces of the well.

A still further provision of the invention is the improvement of a method of producing hydrocarbon liquids with an artificial lift system by injecting lift gas to fluidize the liquid hydrocarbons at one or more gas lift valves vertically spaced along a well. The improvement comprises using a gas enriched in $C_5+$ hydrocarbons, such as wet gas as the lift gas, heating such lift gas and flowing it in heat exchange relationship with the fluidized hydrocarbons prior to its said injection.

In yet another provision of this invention is the process of adding a heated gas into crude oil (previously stored and recovered from subterranean foundations) prior to its introduction into the conduit leading to its final destination.

BRIEF DESCRIPTION OF THE FIGURES

The FIGS. 1, 2 and 3 schematically illustrate embodiments of the systems of the present invention, including the configuration of the well and surface equipment used therewith.

DESCRIPTION OF THE INVENTION

Figure 1:
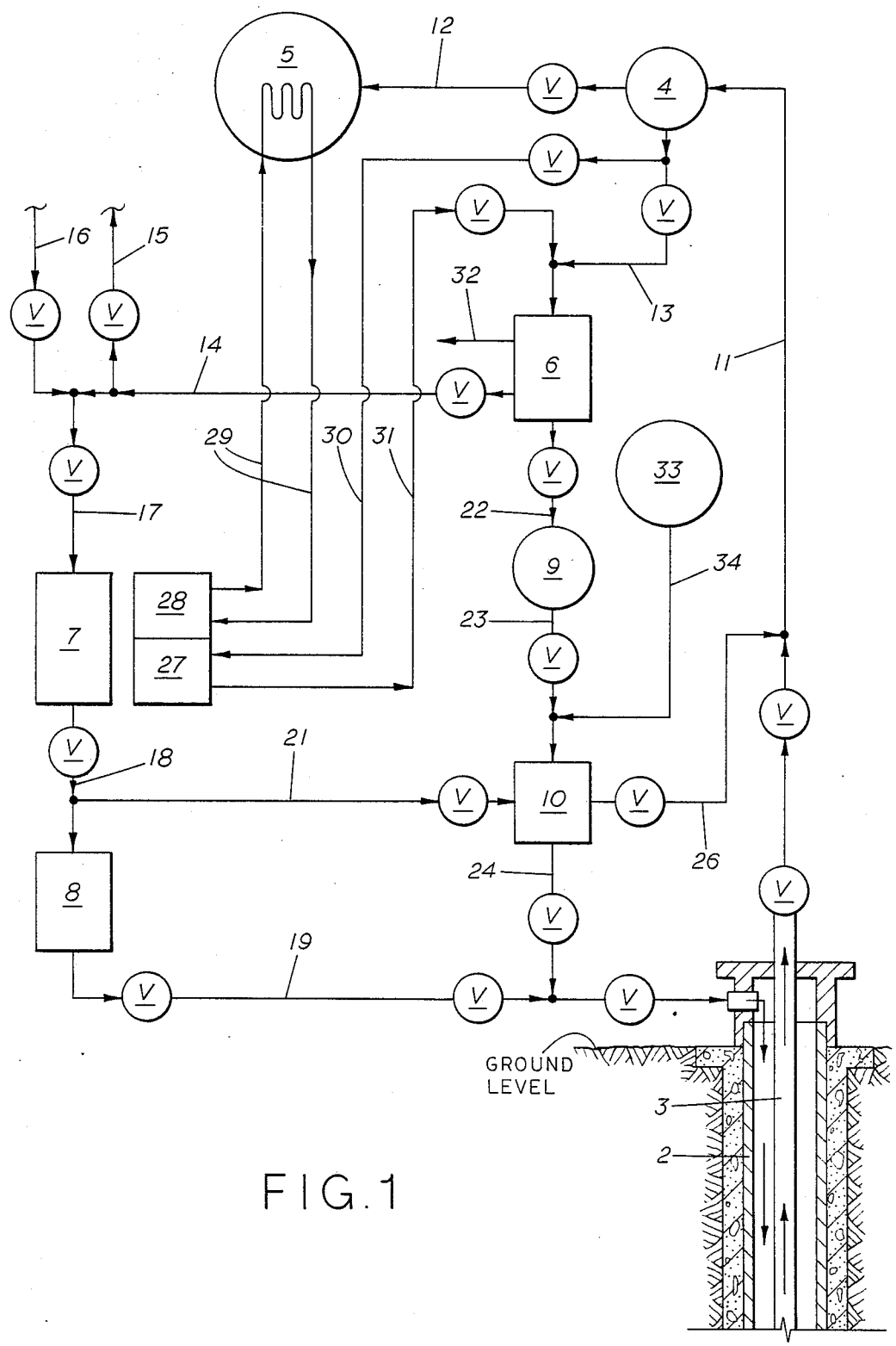

The present invention is generally applicable to the production of virtually any fluid from a subterranean formation through a well completed in conventional manner in fluid communication with the subterranean formation. Such subterranean fluids typically include oil, water, brine, molten sulfur and other molten minerals, saturated mineral leachants from solution mining processes, and the like. Such fluids may occur naturally, or may be obtained as a result of chemically or physically modifying naturally occurring subterranean substances or substances introduced into subterranean formations for the purposes of such modification. The production of such fluids is enhanced by heating because they generally have an improved flowability due to the higher temperature and concomitantly lower viscosity during their travel up the well to the surface.

The method of the invention is particularly attractive for enhancing the production of subterranean fluids which have limited flowability upon substantial reduction of the temperature below that of the subterranean formation from which they are taken. Limited flowability may result from solidification or marked increases in viscosity upon cooling as with heavy crude oils or crude oil with a relatively low cloud or pour point. Heavy oils generally include asphalt-based hydrocarbons having a gravity below 20° API, and especially in the range of 5°–10° API. A pour point below the ambient surface and/or subsurface temperature also results in an oil with limited flowability.

The term "limited flowability" as used in the present specification and claims is also descriptively inclusive of subterranean fluids containing components which tend to precipitate or deposit upon cooling to foul the wellbore conduit through which they are produced or surface facilities in which they are processed. Exemplary of such fluids are oil with a high paraffin content (i.e. more than 5% by weight of the oil) or high asphalt content (i.e. more than 5% by weight of the oil), saturated mineral solutions, and the like.

Subterranean formations generally include porous rock formations, and also subterranean cavities, whether naturally occurring or resulting from processes such as solution mining and the like. At reservoir conditions in such subterranean formations, the fluids contained therein are generally flowable to a well penetrating the formation. However, due to the thermal gradient of the earth's crust, the fluids normally experience a temperature drop as they are conducted up the well through gradually cooler formations until they reach the surface. As mentioned above, many fluids have limited flowability under such conditions. For convenience, reference is made hereinafter to crude oil with the understanding that other subterranean fluids may be processed according to the invention.

It has been discovered that the flowability of oil may be maintained by flowing a heated gas in the well in heat exchange relationship with the fluid from the reservoir as it is conducted up the well. The heated gas of this invention is enriched in $C_5$ plus hydrocarbons. While the gas employed is normally saturated, preferably supersaturated, with the $C_5+$ hydrocarbon fraction, the minimum amount of $C_5+$ hydrocarbons that can be employed in this invention is dependent upon the amount of wax or asphalt in the crude to be recovered. If the wax/asphalt content of the crude oil is low to moderate (0 to 15 wt. %), the minimum amount of $C_5$ plus fraction required is generally between 5 to 8 gallons per thousand cubic feet of recompressed gas. An increased $C_5$ plus fraction is required when the wax/asphalt content of the crude is in excess of 15%. Generally, about 12 to about 15 gallons of $C_5$ plus fractions per thousand cubic feet of recompressed gas is required in areas where the wax/asphalt content is greater than 15%, e.g., Wasatch crude produced in Altamont, Utah. Such crudes are further characterized by their higher pour points.

The requisite amount of $C_5+$ hydrocarbon employed in this invention can usually be obtained from the wet gas entrained in the fluid produced from the well. Following separating this wet gas may be recycled back into the well at elevated temperature. Further, such wet gas can be further saturated with a $C_5$ plus fraction previously separated and obtainable from an incoming gas line. Such fractions usually are characterized by an end boiling point of about 210° C. Still further, $C_5+$ enriched gas employed in this invention can be produced by mixing the $C_5$ plus fraction obtained by a method above with nitrogen, carbon dioxide, flue gas or natural gas.

The heated gas decreases the tackiness of the crude recovered attributed to the presence of paraffin and/or asphaltene. In particular, the viscosity index and pour point of the recovered crude are lower than that of the crude in the subterranean formation. Generally pour point and cloud point of the recovered crude is between 30° and 75° F. lower than those of the subterranean crude oil and these low indices are permanent and non-reversable.

Generally, the heat exchange should be sufficiently vertically extensive in the well, and the temperature of the heated gas sufficiently elevated with respect to the fluid flowing up the well along the vertical extent of the heat exchange therewith, to maintain the flowability of the subterranean fluid being conducted up the well at substantially all depths thereof. Preferably, the heating in the well is also sufficient to elevate and maintain the temperature of the fluid as it is processed in surface facilities associated with the well, such as lines, separators, storage tanks and the like. The flowability is maintained by maintaining the temperature of the fluid above its pour point and above the temperature at which any components in the fluid tend to precipitate or deposit to limit flowability.

The temperature of the heated gas and the vertical extent of the heat exchange, as well as the flow rate, pressure and type of gas used, depend on the conditions in which the method is employed. Typical factors influencing the required temperature of the heated gas include the depth, pressure and temperature of the producing formation, the oil production rate, the temperature at which limited flowability is experienced, the configuration of the well and the type of subterranean fluid produced. It is readily appreciated that in order to function as a heating medium, the gas conducted in the well for heat exchange purposes will need to be at least at a temperature higher than the crude oil which is being heated and produced (thereby for at least some distance or at some area in the well). In particular, it is the reduction of the pour point (attributed to the heated gas) which prevents the build-up of paraffin or asphaltene in the tubing and wellbore during production.

If the gas is exposed to or mixed with the fluid produced from the subterranean formations, it should generally be chemically nonreactive therewith at the downhole conditions.

The gaseous heat exchange medium may be compressed and heated as required by conventional compressors and heating units. Gas available at sufficient pressures may not require compression. Similarly, gas available at suitable temperatures may not require heating. Suitable heating means typically include steam and electrical resistance heaters, but preferably are direct gas or oil-fired heaters because of the generally ready availability of such fuels in the typically remote location of the well. In some instances, the temperature increase resulting from compression may be sufficient without a discrete heating step.

The heated gas used as the heat exchange medium may, following the heat exchange step, be advantageously mixed with the oil downhole, or it may be returned separately to the surface. It is also contemplated that the gaseous heating medium may be injected in the producing formation or another formation penetrated by the well or an offset well as desired. When the heated gas is mixed with the oil in the well, it can also function as a lift gas as in conventional gas lifting to fluidize and lift the reservoir fluid to the surface by expansion. Such gas lifting typically involves positioning one or more conventional gas lift valves spaced vertically in the well and injecting the lift gas into the oil in the well through the lift valves.

The heat exchange between the hot gas and the produced crude oil takes place in the well at a suitable surface provided therefore. Preferably, the crude oil is produced through a centrally disposed tubing in the wellbore, and the hot gas is conducted around the tubing through the annulus between the tubing and the casing or wall of the wellbore. It is also contemplated that the hot gas may be conducted through the tubing with the oil being produced through the annulus, or that the hot gas may be conducted through a heat string tubing into the annulus with the oil being produced through the production tubing. However, the former configuration is preferred since the hot gas flowing in the annulus functions as a thermal barrier to limit heat transfer from the crude oil plus heats the surrounding formations after a period of time as it ascends the tubing.

The heat exchange between the hot gas and the crude oil in the wellbore is preferably countercurrent as in the configuration wherein gas flows down the annulus and crude oil is conducted through the tubing. As the gas flows down the annulus, it transfers heat to the upwardly flowing oil, but the gas also loses some heat to the formations it traverses on its descent. While the gas may be at a higher temperature than the oil even at the point where it is admixed with the oil or otherwise disposed of, at some depth below the surface the gas may eventually reach a temperature about equal to that of the oil in the tubing at the same depth. At this "isothermal" depth, the gas is no longer in heat exchange with the oil, but the temperature at the isothermal depth should be sufficiently elevated that precipitation of paraffin or asphalt in the crude oil does not occur.

Below the isothermal depth the oil will be at an increasingly higher temperature as the depth of the producing formation is approached. Even below the isothermal depth, however, the gas may function as a thermal barrier because of its reduced thermal conductivity relative to a liquid or the surrounding formation, and may also be heated before admixture with the crude oil owing to the higher temperature of the formations traversed below the isothermal depth, thereby supplementing the overall thermal efficiency. By introducing the gas into the annulus at a sufficiently elevated temperature to maintain the flowability of the oil at all depths above the isothermal depth, the gas effectively maintains the crude oil in a flowable state at substantially all depths of the well.

Paraffin or asphaltene and other deposits may be removed by operation of the process of this invention as hereinabove described. Further, descaling may be achieved by the injection of a chemical additive into the well. Any chemical additive normally employed in descaling of wells may be used, such as those within the embodiments of the publication entitled "Formation Damage Prevention through the Control of Paraffin and Asphaltene Deposition", *Society of Petroleum Engineers of AIME* (1985) and the references cited and discussed therein, all of which is herein incorporated by reference.

Numerous salutary benefits stem from the present method. In the well, the heating of the oil improves the flowability thereof as it is conducted to the surface by reducing its viscosity, maintaining a temperature above the pour point of the oil, and eliminating buildup of paraffin, asphalt and other precipitates. This in turn increases the production rate by increasing the flow rate of the oil being conducted in the well, and also by reducing the frequency of maintenance of the well which would otherwise be associated with fouling of the tubing and fouling and breakdown of downhole pumps and other downhole equipment. In contrast to hot oil treatments and mechanical scraping of the production tubing heretofore required to remove paraffin deposits, no down time is necessary with the present method to remove such deposits. If the gas is hot enough to heat the producing formation in the vicinity of the wellbore, it is also contemplated that the production may be further enhanced by improving the flowability of the fluid in the formation adjacent the wellbore.

Especially when the heated gas is employed as lift gas in an artificial lift system, the energy requirements of producing the oil are significantly reduced in contrast to sucker rod pumps and downhole hydraulic jets and pumps. Even in comparison with conventional gas lift systems employing unheated gas at ambient surface temperatures, the present method improves efficiency by reducing the density of the lift gas and also by improving oil flowability as noted hereinabove.

With crude oil production from formations which eventually require some form of artificial lift system, the wells generally have to be reworked to install conventional lift systems such as sucker rod pumps or downhole hydraulic pumps. With the present lift system, however, the gas lift valve or valves can be installed with the original production tubing in anticipation of their eventual need. This is particularly advantageous in wells in which conventional gas lifting would not otherwise be feasible or economical.

At the surface, the relatively higher temperatures of the crude oil produced using the present method tends to reduce fouling and freezing of surface lines, separators and oil and water storage tanks. Further, the heated gas inhibits the fouling of separator dump valves, pressure regulators and other surface facility instrumentation, thereby reducing the frequency of the maintenance thereof and the concomitant production time lost during such maintenance. In most instances where it would otherwise be required, the necessity of insulating and heating surface lines, equipment and storage tanks is largely obviated by the higher wellhead temperatures obtained with the present method, except under extreme low temperature operating conditions. If desired, however, a portion of the heated gas can be diverted in lieu of using independent heating sources, to heat such surface lines, equipment and tanks. The higher temperature of the produced crude oil also improves the efficiency of gas-oil-water separators, and in instances where heated separators would otherwise be required, can obviate the need to provide such heating.

Further, the economics of the present method are enhanced by using a common compressor and/or heater for supplying the heated gas to a multiplicity of wells. This is in contrast to common power fluid systems for downhole hydraulic jets or pumps which can feasibly be used only with a limited number of closely spaced wells.

The present method also makes feasible the use of gas lift systems for heavy oils which would otherwise have such a limited flowability that downhole pumps or other mechanical lifting means would be required, and also for producing crude oil which could not be feasibly produced even with such mechanical lift systems. For example, sucker rods are not generally feasible in deep wells, e.g. 8,000–10,000 feet, or in deviated holes. In comparison with such mechanical lifting systems, it is readily appreciated that the relatively frequent maintenance of such systems is eliminated by gas lifting of the heavy oil. Further, in comparison with power fluid/heat string systems, the additional tubing for the heat string may be entirely eliminated in the present method and system.

In those circumstances where injection of the heated gas is not possible, such as in a rod-pumping well, the heated gas employed in this invention may be directly added, if necessary, to stored and recovered crude oil, after it exits the storage tank and prior to its introduction into the desired pipeline tank, refinery, processing plant or other final destination in order to prevent deposition of paraffin.

DESCRIPTION OF PREFERRED EMBODIMENTS

Figure 2:
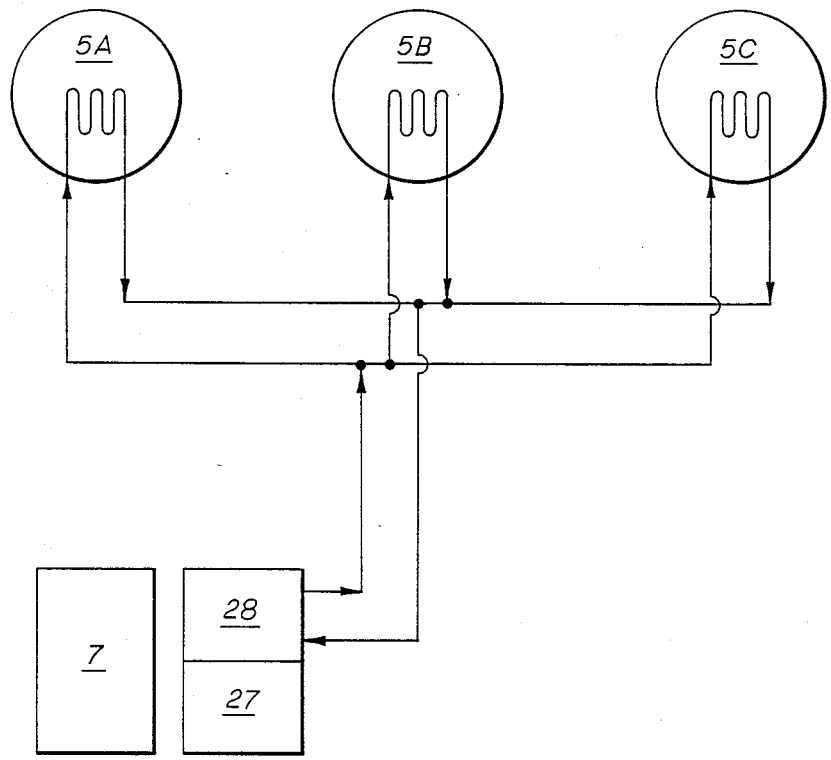

Referring now to the schematic diagram seen in FIGS. 1 and 2, fluid withdrawn from a paraffin or asphalt-based hydrocarbon reservoir travels up the tubing 3 to the surface and then to separator 4. Water, oil and gas are removed from the separator 4 in storage tanks 5A, 5B, and 5C, respectively (FIG. 2) or via gas flowline 30 to a final stage cooler 27. Wet gas is removed from separator 4 and is transferred via flowline 13 to secondary separator 6 (along with compressed gas from 27) whereupon condensate $C_5$ plus is passed to storage tank 5C tank 9 via flowline 32 or to and then to suction compressor cooler 28. (Additional gas, if required, can be obtained from outside gas line 16). If desired, gas from separator 6 may be placed directly in sales line 15. Gas compressor 7 discharges via line 18 to heater 8 which in turn may be fed into well annulus 2. Prior to entry into the well annulus via discharge line 19, gas may be mixed with $C_5$ plus hydrocarbons stored in 5C and 9 via solvent discharge line 24 from in section pump 10. (Solvent can alternatively be pumped via exhaust line 26 back into production flowline 11). In order to descale depositions during production chemical agent may be discharged from storage 33 to injection pump 10 via discharge line 34.

Figure 3:
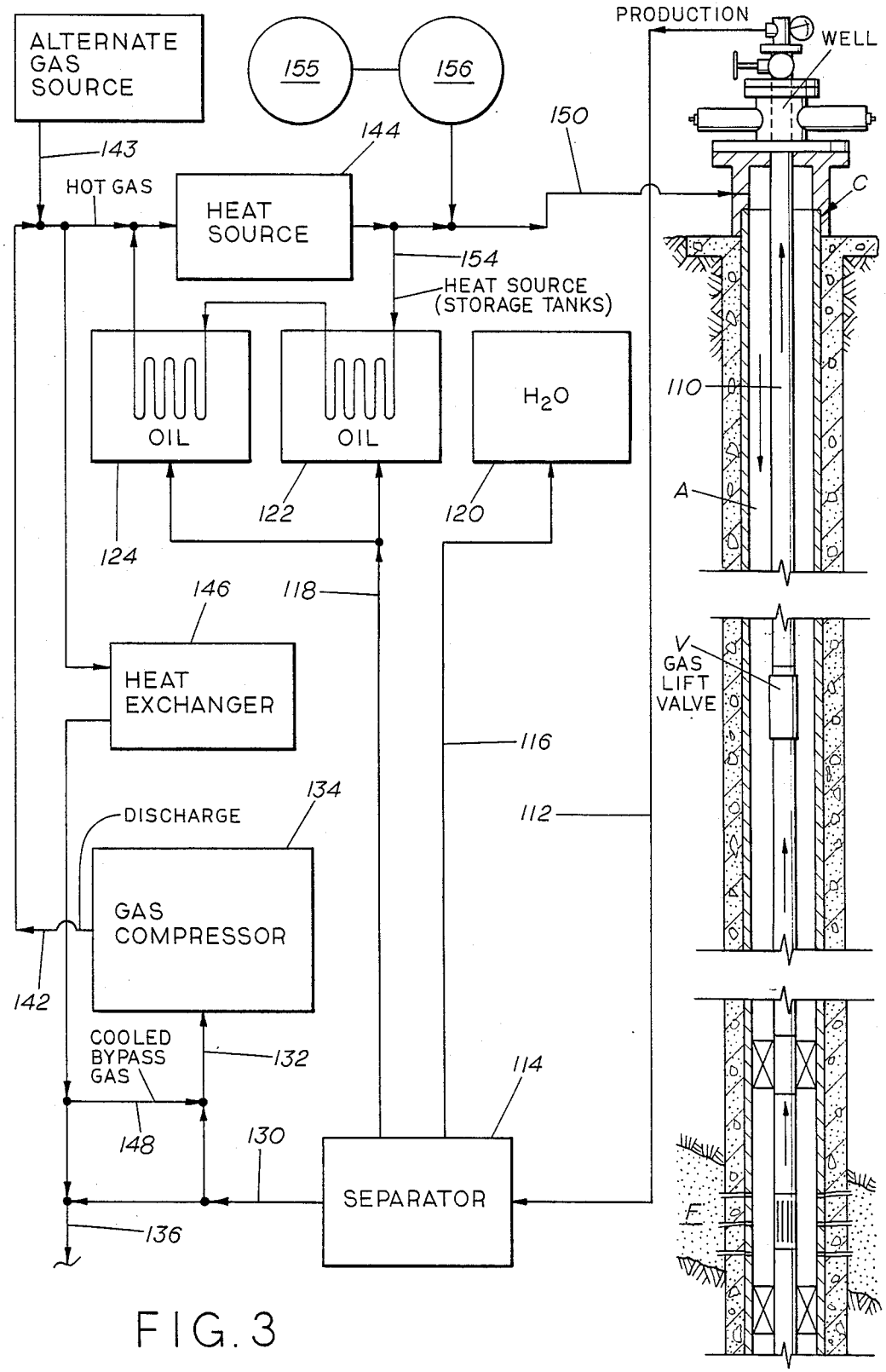

In FIG. 3, a well W is completed in a paraffin-based hydrocarbon reservoir F according to conventional techniques. Fluid withdrawn from the reservoir F travels up the tubing 110. Heated lift gas travels down the annulus A between the tubing 110 and the casing C. The lift gas is then injected into the tubing 110 through one or more of the lift valves V at an effective depth. The lift gas in the annulus A heats and maintains the flowability of the fluidized oil in the tubing around which it descends before the gas is injected into the tubing.

Fluid produced via production tubing 110 is taken off in line 112 and processed in separator 114. Water and oil are removed from the separator 114 in lines 116 and 118 and kept in storage tanks 120, 122 and 124 as is conventional. Wet gas from the separator gas line 130 is introduced to the suction feed line 132 of gas compressor 134, or directly to a gas sales line 136 as desired.

Compressor 134 discharges compressed gas into discharge line 142 to heater 144. If desired, gas may be taken from line 142, cooled in exchanger 146, and placed directly in sales line 136 or recycled to the compressor suction feed line 132 through recycle line 148. Additional gas required for system may be obtained from alternate source through line 143.

Heater 144 may be a steam heater or an electrical resistance heater, but is preferably a gas or oil-fired direct combustion heater. Hot gas from the heater 144 in line 150 is fed to the well annulus A. At the wellhead, the heated gas is at a higher temperature than the produced mixture of oil, gas (including lift gas) and water in order to transfer heat from the lift gas in the annulus A to the contents of the tubing 110. If desired, a portion of the hot gas may be diverted from line 150 through line 154 for heating the oil storage tanks 122 and 124, and other surface equipment (not shown). If descaling of build-up is needed during crude oil production, chemical agent may be discharged from chemical storage tank 155 to chemical injection pump 156 into the well annulus A.

EXAMPLE 1

The method of the invention was used to produce oil from a well completed at a depth of 10,775 feet in the Glenrose formation in Houston County, Texas and was conducted in accordance with the schematic diagram represented by FIG. 3. The oil had a pour point of 48° F., a paraffin content of about 9.5%, a gravity of 60° API, a gas-oil ratio of about 4000:1, and a water-oil ratio of about 0.06:1. In warmer weather, the well was operated with conventional gas lifting and produced for four months at from 595 to 514 barrels of oil per month for an average of about 559 barrels per month. The formation temperature was 277° F., and with the conventional gas lift the wellhead temperature was about 75° F.

When the night-time temperatures began falling below 48° F. in the mid-fall, the production dropped below 400 barrels per month due to paraffin buildup in the tubing near the surface and in the surface instrumentation. The paraffin buildup in the tubing near the surface restricted the flow from the formation. Paraffin deposits in the pressure regulating valves periodically shut down the lift gas compressor. Also, the dump valves and source gas lines began to plug with paraffin, temporarily shutting down production while they were being cleaned. In addition, the fuel gas line and regulators started to solidify with paraffin deposits.

In mid-to-late fall, a 250,000 Btu/hr in-line heater was used to heat the wet gas compressed into the annulus. The temperature of the gas compressed into the annulus increased from about 35°-60° F. to about 200° F., and the wellhead temperature of the oil increased over a period of about 72 hours to about 90° F. This elevated temperature of the produced oil in turn brought the temperature of all the surface equipment to at least 60° F., and maintained this temperature. This largely eliminated the above-noted problems.

In addition to eliminating the problems associated with paraffin buildup, the production rate increased about 20% to over 650 barrels of oil per month. Also, using the heated gas eliminated the previous need to scrape the tubing twice a month to remove paraffin, eliminated the need to heat the oil storage tanks, eliminated the need for paraffin treating chemicals previously used in the surface equipment, reduced down time, and eliminated the need to remove water accumulated in the oil storage tanks entrained by the paraffin transferred thereto. Quite surprisingly, after several months of operation with the heated gas, the oil recovered from the separator was found to have a non reversable pour point of about $-70°$ F., a paraffin content of about 13.5% and gravity of 63° API.

EXAMPLE 2

Another well was completed in the Edwards formation in Houston County, Texas, near the well of Example 1 with about the same oil and reservoir properties. The well had a 2⅞ inch tubing and a 5 inch casing. Without artificial lift, the well spot-produced about 40 barrels of oil per month by leaving the well shut in and periodically opening the tubing valve. Compressed wet gas at about 800 psi and 200° F. was periodically injected into the annulus for storage purposes and to heat the production tubing, and was subsequently periodically withdrawn. The production rate thereafter increased to about 450 barrels of oil per month plus 3,450 thousand cubic feet (MCF) gas per month with well flowing on a continuous basis.

EXAMPLE 3

(This example was conducted in accordance with the schematic diagram represented by FIGS. 1 and 2.)

A well was recompleted at a depth of about 14,500 feet in the Altamont-Bluebell field in Uintah County, Utah. The oil had a pour point of about 117° F., a paraffin content of about 35%, a gravity of 45° API, and a gas-oil ratio of 1500:1. The bottomhole temperature was 225° F. A 3,000,000 Btu/hr boiler was used to heat water for surface equipment heating, including water and oil lines and storage tanks, and for supplying hot water at 160° F. to a 125 hp power fluid pump system. The power fluid pump supplied the 160° F. water to a downhole hydraulic pump at 3000 psi through a 2⅞ inch tubing string. The hydraulic pump pumped the crude oil from the reservoir to the surface in the annulus. A separate tubing string was also used to pump hot water at a low pressure to maintain the well temperature. The oil was separated at the surface with a 750,000 Btu/hr heater treater operating at about 160 ° F.

The power fluid pump system, the separate heating tubing string, and the downhole pump were replaced by a gas compressor, a 500,000 Btu/hr gas-fired in-line heater, and gas lift valves installed on a single production tubing string. To the wet gas recovered from the heater treater compressed to 800 psi in the compressor was added dirty naphtha, a $C_5$ plus by-product obtained from Coastal from a gas plant in Altamont, Utah. (A representative sample of dirty naphtha contains:

| COMPONENT | MOL % | LIQ VOL % |
|---|---|---|
| Propane | 1 | .72 |
| Isobutane | 1.02 | .82 |
| n-butane | 3.64 | 2.86 |
| Isopentane | 3.48 | 3.18 |
| n-pentane | 7.35 | 6.64 |
| C5 Plus | 83.51 | 85.78 |
| TOTAL | 100% | 100% |

An average total of about 12 to about 15 gallons of $C_5$ plus per thousand cubic feet of recompressed gas was constantly added. The total gas was then heated in the in-line heater to about 350° F., and supplied to the gas lift valves through the annulus. The oil production rate subsequently increased about 33% and the gas production increased about 1000% due to reduced down time for periodic hot oil treatment and mechanical scraping of the production conduit. In addition, the produced oil was sufficiently hot to be separated without firing the heater-treater, and the elevated temperature of the produced fluid eliminated the need to heat the oil and water storage tanks and lines. Moreover, the monthly operating cost and energy requirements of the well were reduced by about 25%. The well could now be economically produced at 24 BOPD (barrels oil produced per day) in contrast to 45 BOPD with the previous system

EXAMPLE 4

A well similar to that of Example 3 was recompleted at a depth of about 8,900 feet in the Altamont-Bluebell field in Uintah. The oil had a pour point of about 112° F., a paraffin content of about 33%, a gravity of 46° API, and a gas-oil ratio of 500:1. The bottom hole temperature was 200° F. A 3,000,000 Btu/hr in line heater was used to heat water for surface equipment heating, including water and oil lines and storage tanks, and for supplying hot water at 160° F. to a 125 hp power fluid pump system. The power fluid pump supplied the 160° F. water to a downhole hydraulic pump at 3000 psi through a 2⅜inch tubing string. The hydraulic pump pumped the oil from the reservoir to the surface in the annulus. A separate tubing string was also used to pump hot water at a low pressure to maintain the well temperature. The oil was separated at the surface with a 750,000 Btu/hr heater treater operating at about 160° F.

The power fluid pump system, the separate heating tubing string, and the downhole pump were replaced by a gas compressor, a 500,000 Btu/hr gas-fired in-line heater, and gas lift valves installed on a single production tubing string. To the wet gas recovered from the heater treater compressed to 800 psi in the compressor was added dirty naphtha, a $C_5$ plus by-product obtained from Coastal from a gas plant in Altamont, Utah. (A representative sample of dirty naphtha contains:

| COMPONENT | MOL % | LIQ VOL % |
|---|---|---|
| Propane | 1 | .72 |
| Isobutane | 1.02 | .32 |
| n-butane | 3.64 | 2.86 |
| Isopentane | 3.48 | 3.18 |
| n-pentane | 7.35 | 6.64 |
| C5 Plus | 83.51 | 85.78 |
| TOTAL | 100% | 100% |

An average total of about 12 to about 15 gallons of $C_5$ glue per thousand cubic feet of recompressed gas was added. The total gas was then heated in the in-line heater to about 350° F., and supplied to the gas lift valves through the annulus. The oil production rate subsequently increased about 340% due to reduced down time for periodic hot oil treatment and mechanical scraping of the production conduit. In addition, the produced oil is sufficiently hot to be separated without firing the heater-treater, and the elevated temperature of the produced fluid eliminated the need to heat the oil and water storage tanks and lines. Moreover, the monthly operating cost and energy requirements of the well were reduced by about 25%. The well can now be economically produced at 24 BOPD (barrels oil produced per day) in contrast to 45 BOPD with the previous system.

EXAMPLE 5

A well located in the Denver-Julesberg Basin approximately 35 miles east of Denver, Colo. was treated with the process schematically represented by FIG. 3. The 7,800 foot well was completed without a packer utilizing a gas plunger lift system whose primary function was scraping paraffin and secondary function was artificially lifting the well. The well had less than 5% paraffin when first drilled and put on production, a gravity of 38° API, a current gas-oil ratio of 25,000:1, a bottom hole temperature of 218° F., an initial production of 288 BOPD and 496 thousand cubic feet of gas per day (MCFG/D). A 45 horsepower gas compressor, a 250,000 BTU/hour gas heater was used in conjunction with the existing production equipment. The heated wet gas was compressed and injected down the annulus. During the first 30 days the well produced crude oil with up to 95% paraffin as the wellbore, tubing and formation was cleaning up. After ninety days the well's gas production increased 57% with a slight increase in oil production and the well was flowing naturally with no further need for artificial lift. After six months the process was removed and the well's production decreased to 50 MCFG/D and 3 BOPD in less than three months.

EXAMPLE 6

Molten sulfur is recovered by injecting heated air, gas and/or water at about 350° F. through a plurality of injection wells in a typical five-spot pattern into a subterranean sulfur deposit. The heated gas and/or water melts the sulfur in the subterranean deposits. The sulfur is recovered through a tubing string using a lift gas supplied to the annulus at about 350° F. and injected into the sulfur in the tubing string just above the sulfur deposit through a gas lift valve.

The foregoing description of the invention is illustrative and explanatory thereof. Various changes in the materials, apparatus, and particular steps employed will occur to those skilled in the art. It is intended that all such variations within the scope and spirit of the appended claims be embraced thereby.

We claim:

1. A method for producing fluid from a subterranean formation wherein said fluid has a pour point lower than that of the fluid in the subterranean formation, comprising the steps of:
    (a) conducting to the surface a fluid from subterranean formation through a well in fluid communication therewith; and
    (b) flowing a gas enriched in $C_5$ plus hydrocarbons into the well in countercurrent heat exchange relationship with the fluid being conducted from the formation, the gas being at a higher temperature than the fluid conducted from the formation in at least a portion of the well.

2. The method of claim 1, further comprising:
    recovering wet gas from the fluid produced at the surface;
    heating at least a portion of the recovered wet gas; and
    recycling the heated recovered wet gas as at least a part of the gas in step (b).

3. The method of claim 1, wherein the subterranean fluid comprises molten sulfur.

4. The method of claim 1, wherein the subterranean fluid comprises crude oil.

5. The method of claim 1, wherein the amount of $C_5$ plus hydrocarbon in the gas introduced into the well is about five to about eight gallons per thousand cubic feet of gas.

6. The method of claim 1, wherein the amount of $C_5$ plus hydrocarbon in the gas introduced into the well is about 12 to about 15 gallons per thousand cubic feet of gas.

7. A method for producing fluid from a subterranean formation through a well in fluid communication therewith, comprising the steps of:
    (a) conducting fluid from the subterranean formation into the well;
    (b) enhancing the fluidity thereof in the well with a lift gas;
    (c) producing the enhanced fluid at the surface;
    (d) separating and recovering wet gas from the produced fluid;
    (e) heating at least a portion of the recovered wet gas to a temperature above that of the enhanced fluid produced at the surface;
    (f) conducting the heated wet gas down into the well in heat exchange with the enhanced fluid; and
    (g) using the wet gas conducted down the well in step (f) as the lift gas in step (b).

8. The method of claim 7, further comprising adding to said wet gas prior to step (e) a $C_5$ plus hydrocarbon.

9. The method of claim 7, wherein the fluid conducted from the subterranean formation comprises crude oil.

10. A method for producing fluid from a subterranean formation through a well in fluid communication therewith, comprising the steps of:
    conducting fluid from the subterranean formation into the well;
    heating and compressing a lift gas;
    admixing the heated lift gas with the fluid at one or more gas lift valves positioned in the well near or above the producing formation at an effective depth beneath the surface to lift the fluid thereto;
    placing the admixture in heat exchange relationship with the heated lift gas prior to said admixture of the lift gas, the lift gas being at a higher temperature than the admixture;
    producing the admixture at the surface;
    recovering wet gas from the admixture; and
    recycling at least a portion of the recovered wet gas for use as said lift gas to the heating and compressing step.

11. The method of claim 10, wherein the admixture is produced through a tubing string centrally disposed in the well and the lift gas is conducted to the lift valve or valves through the annulus around the tubing in countercurrent heat exchange with the admixture.

12. The method of claim 10, wherein said fluid conducted from the formation comprises crude oil.

13. The method of claim 12, wherein the oil has a gravity less than about 20° API.

14. An artificial lift system for producing oil from a subterranean formation, comprising:
    a well in fluid communication with the formation;
    means for conducting crude oil from the formation into the well;
    means for injecting lift gas into the crude oil in the well at a depth, rate, temperature and pressure effective to lift the crude oil to the surface;
    means for heating the lift gas to a temperature in excess of that of the fluid produced at the surface;
    means for placing the heated lift gas in heat exchange relationship in the well with the fluid being lifted to the surface;
    separator means for recovering wet gas from the oil produced at the surface; and
    means for recycling at least a portion of the recovered wet gas for use as said lift gas to the heat exchange means.

15. The system of claim 14, wherein the injection means comprises one or more lift valves spaced vertically in the well beneath the surface near or above the formation.

16. The system of claim 15, further comprising a common compressor system for supplying lift gas to a plurality of wells.

17. The system of claim 15, wherein the heating means is adapted to heat the lift gas for a plurality of wells.

18. The system of claim 15, wherein the crude oil is heavy crude oil or has a high viscosity or high paraffin or asphalt content.

19. In a method of producing hydrocarbon liquids with an artificial lift system by injecting lift gas to fluidize the liquid hydrocarbons at one or more gas lift valves vertically spaced along a well, the improvement comprising using a gas enriched in $C_5$ plus hydrocarbons as the lift gas, heating the lift gas and placing it in heat exchange relationship with the fluidized hydrocarbons prior to its said injection.

* * * * *